May 27, 1958 J. F. ZISKAL 2,836,195
MULTIPLE CONTROL VALVE MEANS ASSEMBLY
Filed Aug. 2, 1955 7 Sheets-Sheet 1

INVENTOR.
Joseph F. Ziskal
BY
Paul O. Pippel
Atty.

May 27, 1958 J. F. ZISKAL 2,836,195
MULTIPLE CONTROL VALVE MEANS ASSEMBLY
Filed Aug. 2, 1955 7 Sheets-Sheet 2

INVENTOR.
Joseph F. Ziskal
BY
Paul O. Pippel
Atty.

INVENTOR.
Joseph F. Ziskal
BY
Paul O. Pipper
Atty.

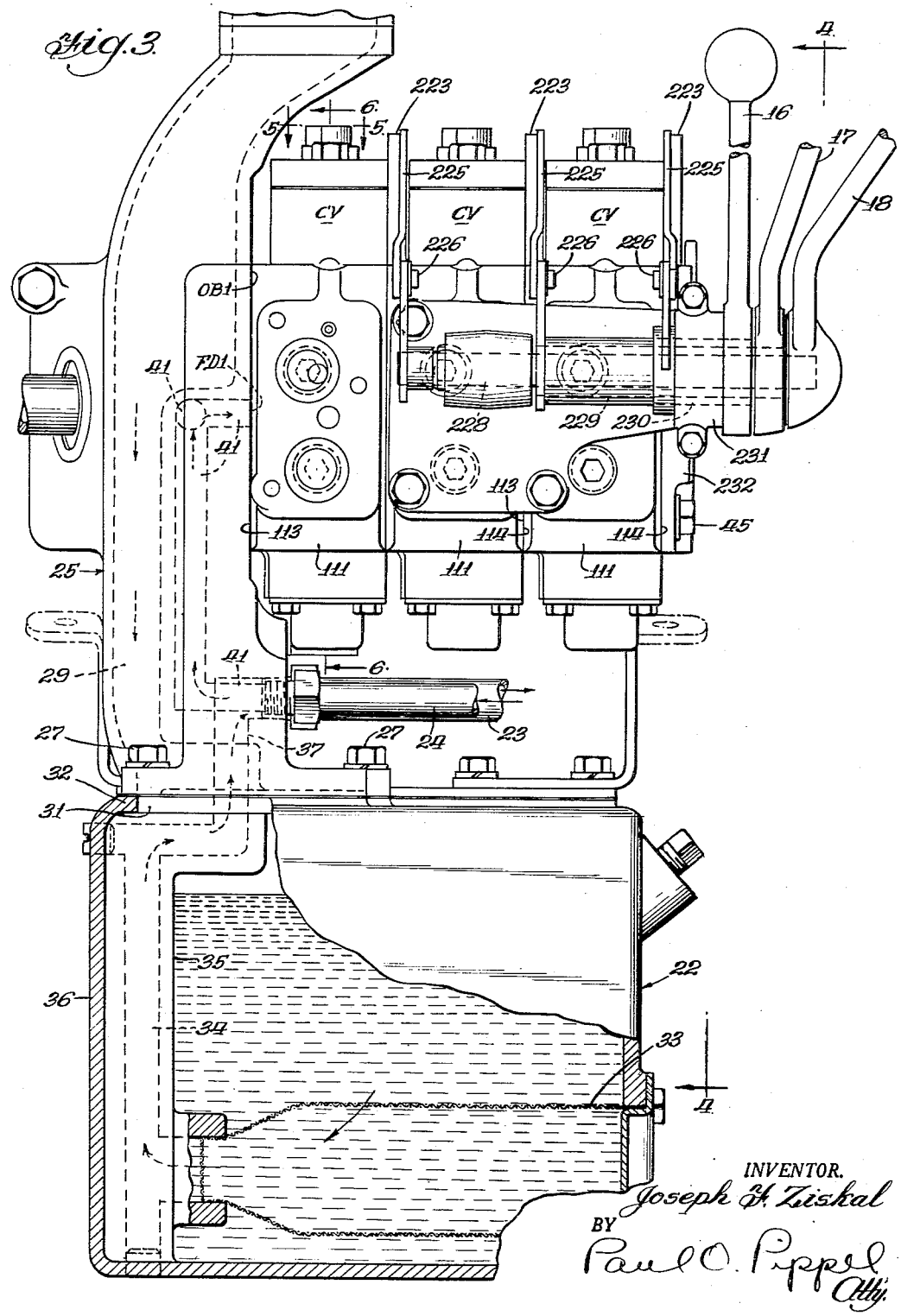

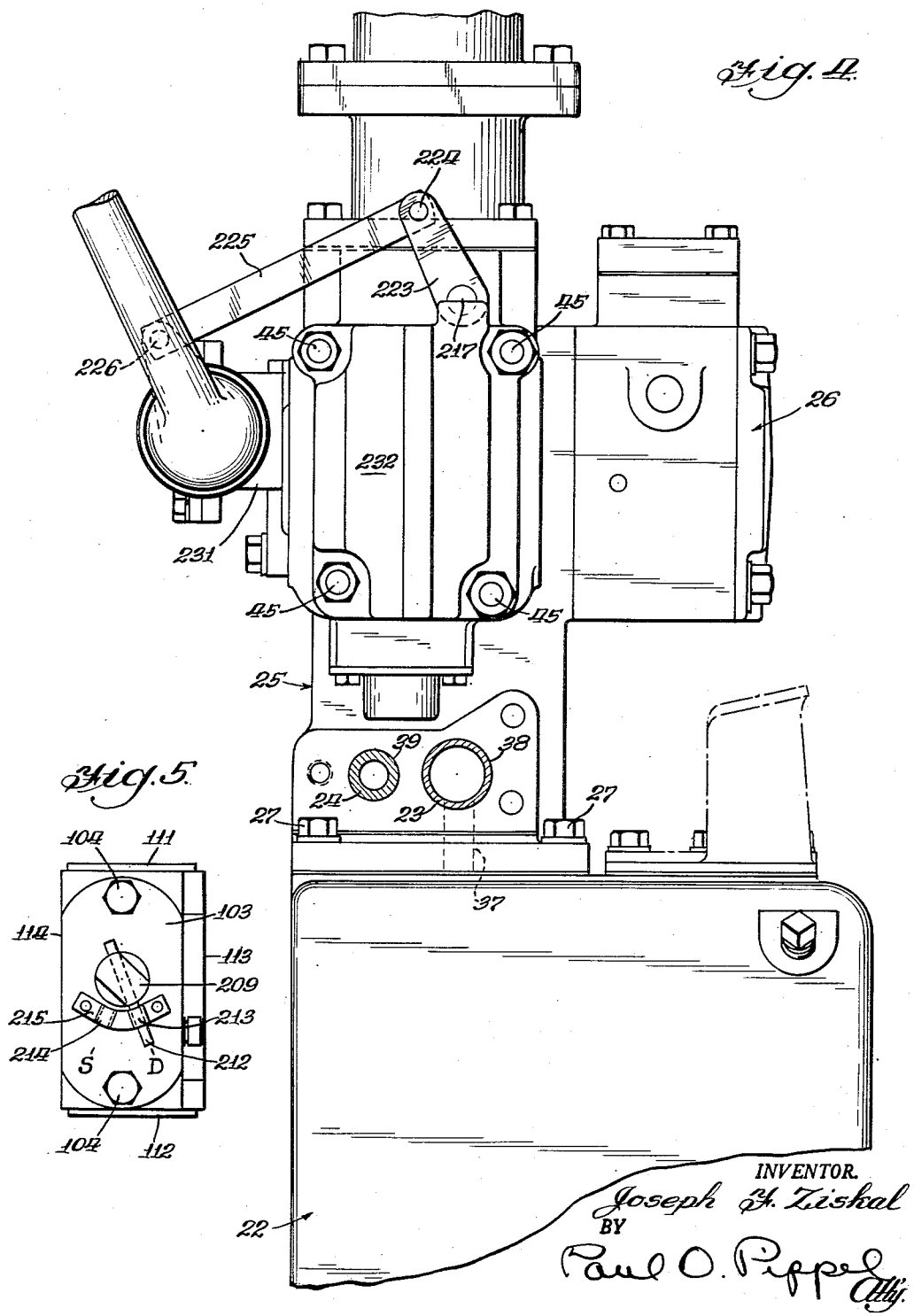

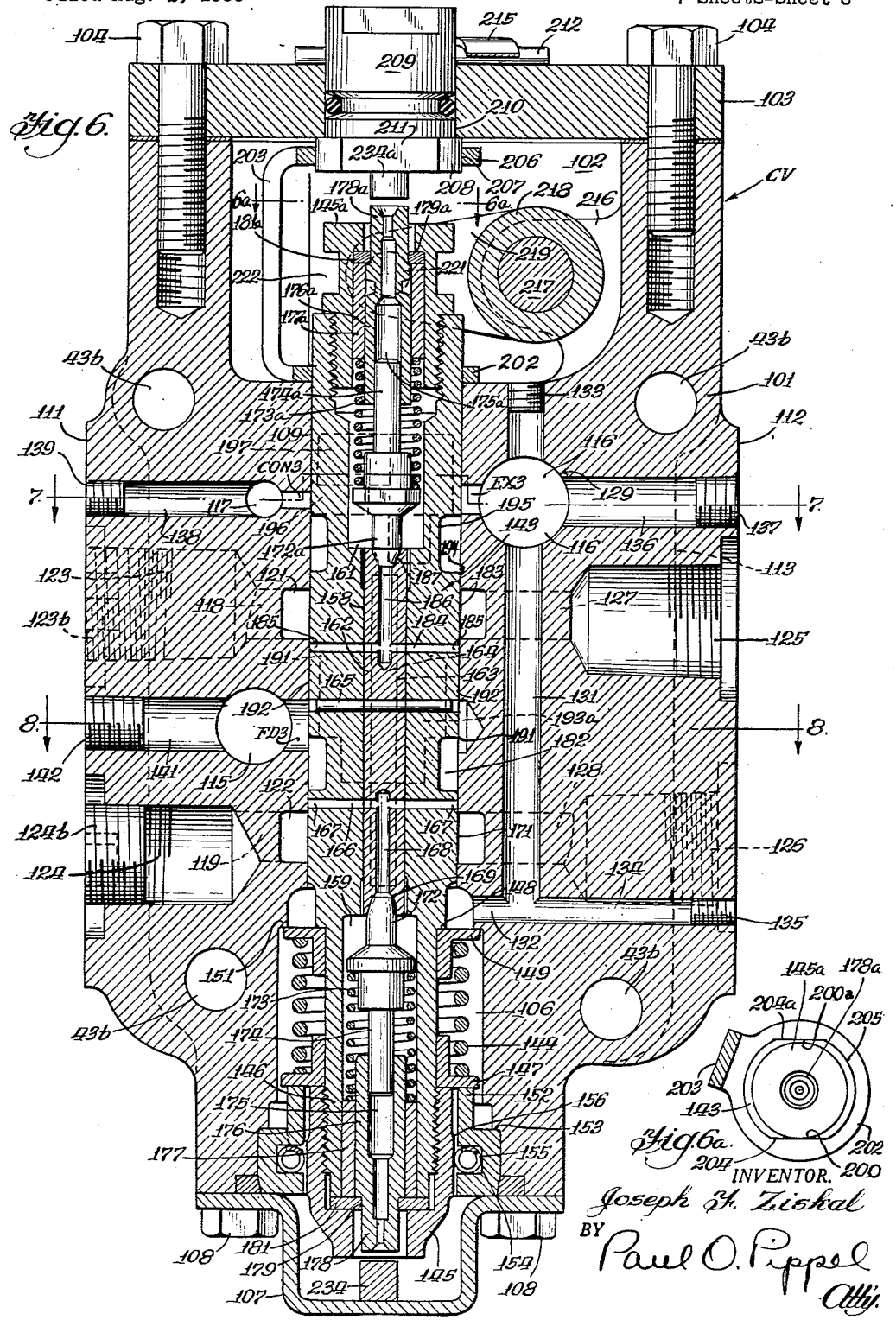

May 27, 1958  J. F. ZISKAL  2,836,195
MULTIPLE CONTROL VALVE MEANS ASSEMBLY
Filed Aug. 2, 1955  7 Sheets-Sheet 7

INVENTOR.
Joseph F. Ziskal
BY
Paul O. Pippel
Atty.

United States Patent Office 2,836,195
Patented May 27, 1958

2,836,195

MULTIPLE CONTROL VALVE MEANS ASSEMBLY

Joseph F. Ziskal, Brookfield, Ill., assignor to International Harvester Company, a corporation of New Jersey Application August 2, 1955, Serial No. 526,050

13 Claims. (Cl. 137—621)

This invention relates to hydraulic power transmitting apparatus and more particularly concerns an apparatus including a control valve disposed between a hydraulic ram and a source of pressure fluid that comprises a pressure controlling unit having a control port and adapted to cause the source to deliver fluid at a nominal by-pass pressure when the flow of fluid is blocked from the control port but causing the source to deliver fluid at high pressure when the control port is unblocked, and the control valve being in control of the blocking and unblocking of such control port as well as communication between the source and the ram.

The embodiment of the invention herein disclosed is mounted upon a farm tractor and supplied with operating fluid, preferably oil, by a pump which is driven from the tractor engine. This pump draws the fluid from a reservoir and delivers the same to a manifold tower where the fluid is received in a fluid delivery passage. The manifold tower also includes an exhaust passage with a branch communicating back to the reservoir. A pressure controlling unit is mounted upon the manifold tower and includes a fluid delivery passage communicating with the fluid delivery passage of the manifold tower and an exhaust passage communicating with the exhaust passage of the manifold tower. A blocking valve in the pressure controlling unit is adapted, when open, to by-pass the fluid from the delivery passages through the exhaust passages back to the reservoir, but when this blocking valve is closed the fluid cannot escape back to the reservoir and is thus forced to flow outwardly from the manifold tower through a manually operated control valve to a hydraulic ram under control of such valve. A blocking valve controlling device in the pressure controlling unit is operable when fluid is prevented escaping from the control passage of such unit to keep the blocking valve open, and to cause closing of the blocking valve when fluid is allowed to escape from the control passage. There are conduit connections between the control valve and the ram which may be mounted upon the tractor for raising or lowering tillage tools or the like. The ram may be permanently attached to the tractor or it may be the so-called "roving" species connected with the control valve by a flexible hose adapting the ram to be attached at selective positions upon the tractor or elsewhere.

The control valve has, in addition to ports connected communicatively with the ram, a fluid delivery port connected communicatively with the delivery passage of the manifold tower, and an exhaust port communicatively connected with the exhaust passage of the manifold tower. Also the valve has a control port communicating with the control passage of the manifold tower. When the valve is manipulated for establishing communication between the hydraulic ram and the fluid delivery passage of the manifold tower, this valve also establishes communication between the control passage of the tower and the exhaust port of the valve and thus allows fluid to escape from the control passage of the pressure controlling unit wherefore this unit causes its blocking valve to close and prevent low pressure by-pass fluid from the pump through the pressure controlling device to the reservoir so fluid is delivered through the valve to the ram at the necessary pressure for operating this ram.

One of the objects of this invention is the provision in a hydraulic system of the character just explained, of a manifold tower wherein the ports for the fluid delivery passage, the exhaust passage and the control passage within an obverse face of such tower are arranged in a pattern to respectively register with the delivery port, the exhaust port, and the control port in a reverse face of the control valve, and wherein the control valve also has an obverse face with a delivery passage port, an exhaust port and a control port respectively communicating through the body of the valve when the corresponding ports in the reverse face thereof are arranged in a pattern identical with the pattern of ports in the obverse face of the manifold tower so that a plurality of the valves may be mounted in stacked relation with the reverse face of each succeeding valve mounted against the obverse face of the next preceding valve.

A further object is the provision of a pressure controlling unit with obverse and reverse faces each containing a fluid delivery port, an exhaust port and a control port respectively communicating with one another and arranged with the ports in the reverse face identical with the arrangement of the ports in the reverse face of the control valves and with the arrangement of ports in the obverse face identical with the arrangement of the ports in the obverse face of the control valves whereby the pressure control unit can be disposed in stacked relation with such valves and the manifold tower.

A further object is the provision of a control valve comprising a casing wherein there is a plunger selectively movable in opposite endwise directions from a central neutral position to respectively deliver operating fluid to selective ends of the hydraulic ram, together with detent means for releasably holding the plunger in either endwise position, and means operable responsively to an increase in pressure of the operating fluid attendant to the ram reaching either end of its stroke to apply hydraulic pressure to an end of the plunger for overcoming the force of the detent means and initiating return movement of the plunger to its neutral position.

A further object is the operation of a control valve according to the preceding object but wherein the plunger is adjustable rotatively for causing port masking means thereon to register with and mask the control port and the fluid delivery port thereof when the plunger is moved in one endwise direction from neutral to communicatively isolate the valve from the pressure of fluid in the fluid delivery passage of the manifold tower and to prevent the valve from conditioning the pressure controlling unit for placing the system on high pressure operation, and the valve also being operable attendant to such endwise movement of the valve plunger while in this rotative adjustment, to communicatively connect one end of the ram with the exhaust port of the valve to facilitate endwise pumping of the ram plunger to allow floating movement of a tillage tool or the like with which the ram plunger is operatively connected.

The above and other desirable objects inherent in and encompassed by the invention are elucidated in the ensuing specification, the appended claims and the annexed drawings, wherein:

Figure 1 is a perspective fragmentary view of a farm tractor illustrating a preferred species of the invention installed thereon.

Figures 2 and 2a upon respective sheets of drawings complementally and diagrammatically illustrate the present species of hydraulic power transmitting apparatus.

Figure 3 is an enlarged rear elevational view of a manifold tower and control valves of the present apparatus mounted upon a fluid reservoir of which a slide wall portion is broken away.

Figure 4 is a side elevational view taken at the line 4—4 of Figure 3.

Figure 5 is a plan view taken at the line 5—5 of Figure 3 illustrating a rotative adjustment control for one of the control valves.

Figure 6 is an enlarged sectional view taken at the line 6—6 of Figure 3 through one of the control valves.

Figure 6a is a fragmentary sectional view taken at the line 6a—6a of Fig. 6 illustrating the manner in which a driving connector is attached to the valve plunger for controlling its rotative position.

Figure 7:
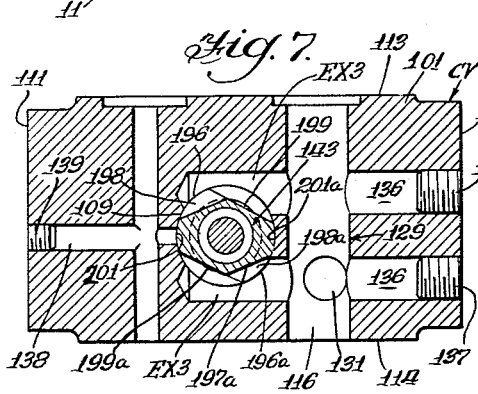
Figure 8:
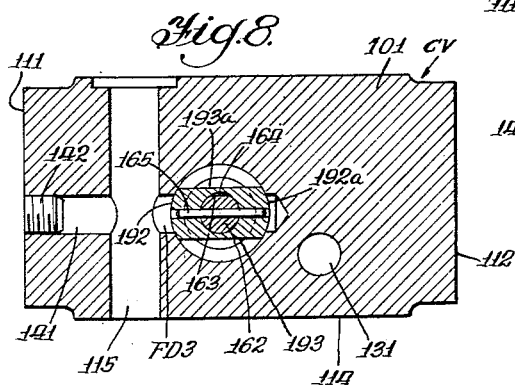

Figures 7 and 8 are transverse sectional views at a reduced scale taken respectively at the line 7—7 and 8—8 of Figure 6.

Figure 9:
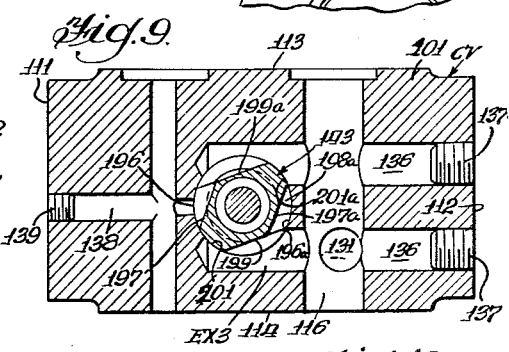
Figure 10:
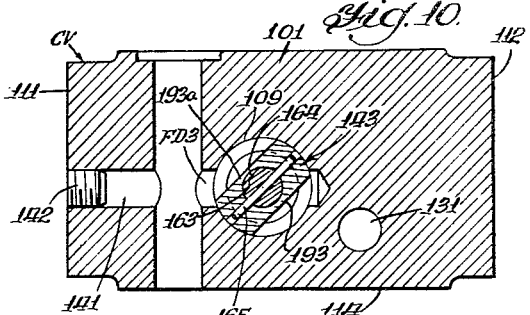

Figures 9 and 10 are views respectively corresponding to Figures 7 and 8 but showing the valve plunger in a different rotative adjustment.

Figure 11:
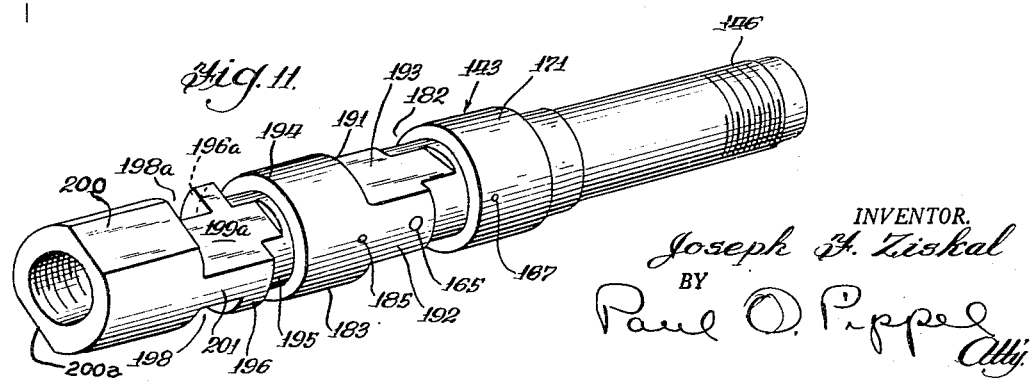

Figure 11 is an enlarged perspective view of the valve plunger in one of the control valves.

Figure 12:
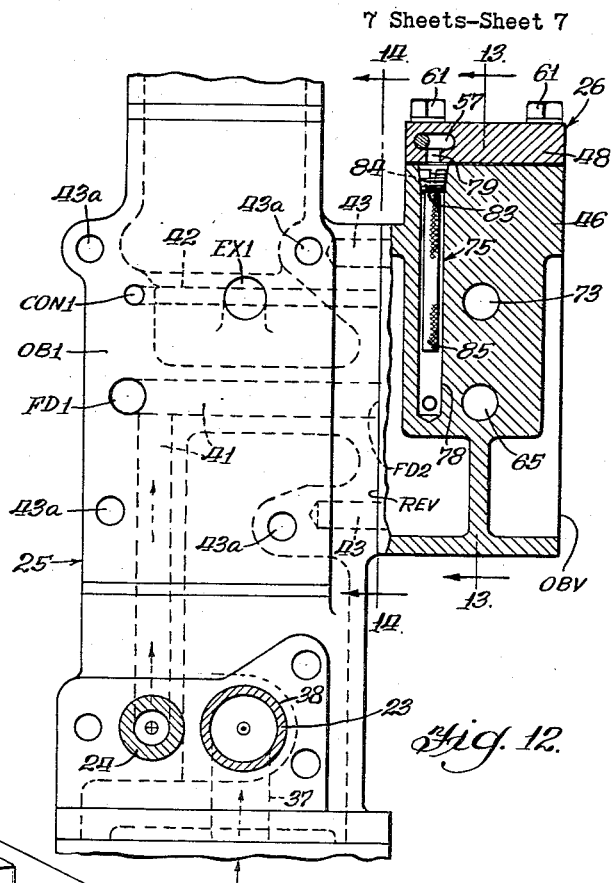

Figure 12 is a fragmentary side elevational view of the manifold tower and the pressure controlling unit mounted thereon shown in section.

Figure 13:
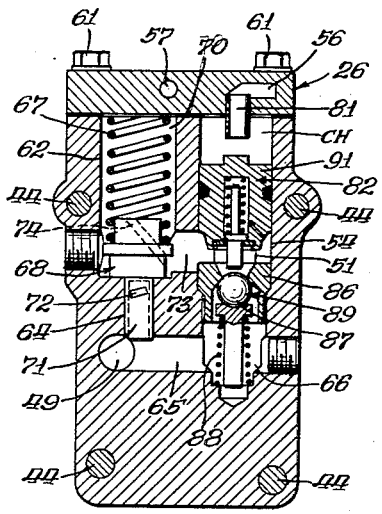

Figure 13 is a vertical sectional view taken through the pressure controlling unit at the line 13—13 of Figure 12.

Figure 14:
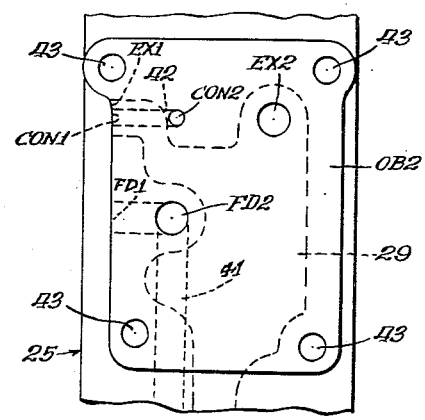

Figure 14 is a fragmentary elevational view of the manifold tower showing an obverse face thereof for sealed attachment of a mating reverse face of the pressure controlling unit.

Figure 15:
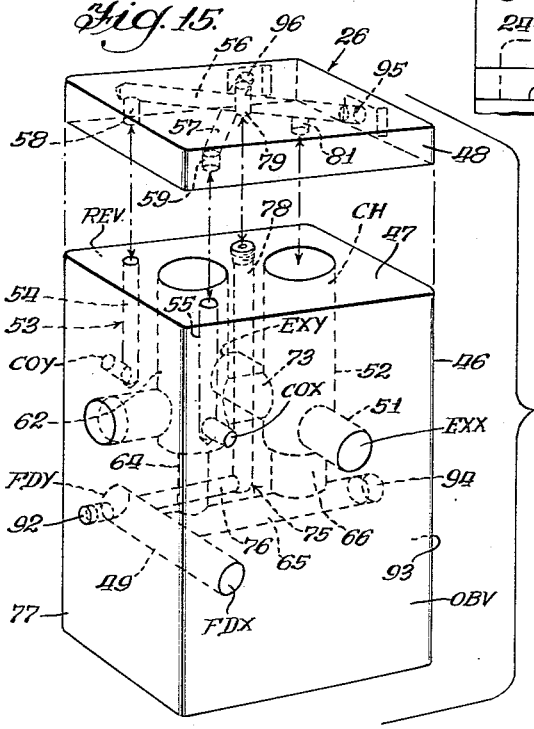

Figure 15 is a somewhat diagrammatic perspective exploded view of the pressure controlling unit casing.

Figure 1:
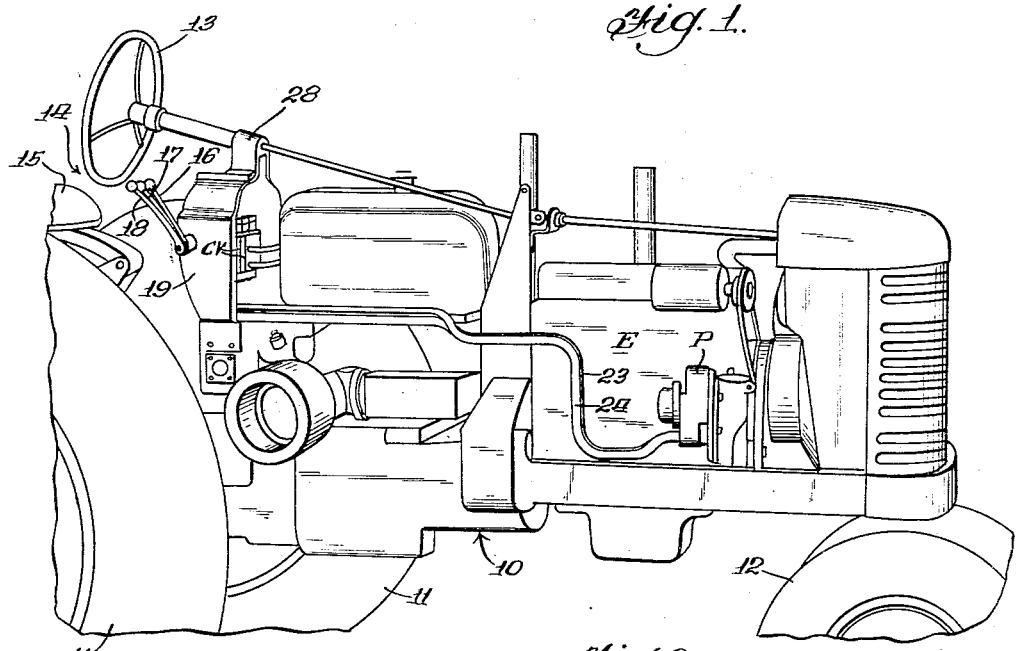

With continued reference to the drawings and particularly to Figure 1, the tricycle tractor 10 there shown has rear traction wheels 11, shown fragmentarily, a front wheel steering truck 12 controlled by a steering wheel 13, and an engine E for driving the traction wheels 11. In the forward part of the operator's station 14 which includes a seat 15, shown fragmentarily, are three control valves CV of which all appear in Figure 3. These control valves are respectively and independently manually controlled by operating handles 16, 17 and 18 as will be explained in detail hereinafter. A sheet metal shroud 19 partially conceals these valves in Figure 1. Valves CV respectively control the flow of operating fluid to and from rams 21 associated therewith as diagrammatically illustrated in Figures 2 and 2a. Fluid for operating the rams is stored in a reservoir 22, Figures 2, 3 and 4.

A pump P constantly driven by the tractor engine draws fluid from the reservoir 22 through a suction conduit 23 and delivers the fluid through a conduit 24 and through passages, later described, in the manifold tower 25, Figures 2, 3, 4, 12 and 14 to the control valves CV for controlled delivery to the hydraulic rams 21.

A pressure controlling unit 26, Figures 2, 4, 12, 13 and 15, mounted on a side of the manifold tower 25 communicates with the fluid delivery passage 41 in the manifold tower to which fluid is delivered by the pump and normally by-passes this fluid back to the reservoir, but this pressure controlling unit is operable responsively to operation of any one of the valves CV to terminate this nominal pressure by-pass of the fluid back to the reservoir and thereby enable the pump to deliver fluid at the necessary pressure for operating any one of the hydraulic rams 21.

The manifold tower 25 is mounted upon the reservoir 22 to which it is secured by capscrews 27. The upper end of the manifold tower provides support for a steering column supporting bracket 28, Figure 1. The exhaust passage 29 which extends vertically in the manifold tower, communicates downwardly through an opening 31 in the upper wall 32 of the reservoir. Within the reservoir is a filter element 33 through which fluid may be drawn into a suction channel 34 within a thickened portion 35 of the reservoir vertical wall 36. This passage 34 leads upwardly into communication with an L-shaped passage 37 in the lower part of the manifold tower. In Figure 4 the upper end of this passage 37 can be seen to terminate in a large opening 38 through which the suction conduit 23 that leads to the pump P communicates. The delivery conduit 24 leading from the pump P can be seen in Figures 3, 4 and 12 to communicate with an inlet opening 39 at the lower end of the fluid delivery passage 41 in the manifold tower. In Figures 3 and 12 this passage 41 can be seen to lead upwardly into communication with two fluid delivery ports thereof, FD1 and FD2; also see Figures 4 and 14. The manifold tower has two obverse faces respectively designated OB1 in Figure 12 and OB2 in Figure 14. The fluid delivery port FD1 is in the obverse face OB1 and the fluid delivery port FD2 is in the obverse face OB2. An exhaust port EX1 in the face OB1 communicates with the cavity like exhaust passage 29 in the manifold tower as does an exhaust port EX2 in the face OB2 of the manifold tower; see Figures 12 and 14. A horizontally disposed L-shaped control passage 42 has opposite end ports CON1 and CON2 respectively communicating with the obverse faces OB1 and OB2, as shown in Figures 12 and 14.

In Figures 12 and 14 it can be seen that the set of ports FD1, EX1 and CON1 are arranged identically in the obverse face OB1 as is the set of ports FD2, EX2 and CON2 in the obverse face OB2. This is to adapt the manifold tower for having the pressure controlling unit 26 mounted on either of these obverse faces for cooperation with the passages respectively communicating with these sets of ports. A set of four threaded recesses 43 at the corners of the obverse face OB2 are for receiving capscrews 44 (Figures 12, 13 and 14) for attaching the pressure controlling unit 26 onto such obverse face OB2. A similarly arranged set of threaded recesses 43a are in the obverse face OB1 for alternative mounting of the pressure controlling unit 26 on this face, although the threaded recesses 43a also are adapted to receive threaded ends of long capscrews 45 (Figures 3 and 4) which may pass through holes in the valves CV for also mounting the desired number of these valves on the face OB1 of the manifold tower.

Figure 2B:
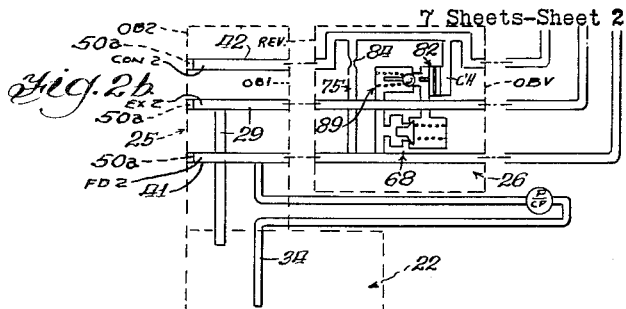
Figure 2b shows a portion of the components illustrated in Figure 2 physically rearranged but adapted to function in the same manner as when assembled in the manner illustrated in Figure 2.

Details of the pressure regulating unit 26 are illustrated in Figures 12, 13 and 15. The casing 46, 48 for this unit comprises a main block-like member 46 having an upper face 47 upon which a cap 48 is seated in sealing relation. The block 46 has an obverse face OBV and an opposite reverse face REV. The obverse face OBV contains a fluid delivery port FDX, a control port COX and an exhaust port EXX. This set of ports FDX, COX and EXX are arranged and spaced identically with the ports FD1, CON1 and EX1 in the face OB1 of the manifold tower and the ports FD2, CON2 and EX2 of the face OB2 of the manifold tower. However, unless the fluid pressure controlling unit 26 is mounted on the manifold tower in series with such tower and a stack of control valve CV, as illustrated in Figure 2b, these ports FDX, COX and EXX will be sealed closed by respective plugs 50, Figure 2, and the reverse face REV of such unit will be mounted upon the face OB2 of the control tower to place fluid delivery port FDY, control port COY and exhaust port EXY respectively in registry with the ports FD2, CON2 and EX2 of such tower.

The fluid delivery ports FDX and FDY are at opposite ends of a straight fluid delivery passage 49 extending through the block 46, as illustrated in Figure 15. An exhaust passage 51 extends straight through the block 46 communicatively between the exhaust ports EXX and EXY. This exhaust passage 51 is intersected by a vertical bore 52 extending downwardly through the upper face 47 of the block 46. Control ports COX and COY are communicative with by a control passage 53 comprising L-shaped channels 54 and 55 in the block 46, and horizontal intersecting bores 56 and 57 in the closure cap 48. A downward lateral 58 of the bore 56 registers communicatively with the upper end of the passage 54 whereas a downward lateral 59 of the bore 57 communicatively registers with the upper end of the passage 55. Capscrews 61, Figure 12, secure the cap 48 to the casing body 46 as illustrated. A second bore, 62, drilled downwardly through the upper face 47 of the block 46 has a reduced diameter lower end portion 64 intersecting and communicating with a horizontal by-pass passage 65 which communicates between the fluid delivery passage 49 and a reduced diameter lower end portion 66 of the vertical bore 52. The large diameter upper end portion of the bore 62 serves as a spring chamber for a spring 67 of a pressure relief valve 68, Figure 13, comprising a head 69 with a tubular extension 71 projecting telescopically downwardly into the small diameter bore portion 64. In the event of excessive fluid pressure in the fluid delivery passage 49 and the by-pass passage 65, this pressure acting upon the lower end of the stem 71 and the lower end of the head 69 will force these parts upwardly against the pressure of the spring 67 until a diagonal hole 72 in the tubular stem 71 communicates with a lateral 73 of the exhaust passage 51 through which the fluid can escape. A diagonal breather hole 74 shown dotted in the relief valve head 69 facilitates breathing of the spring chamber 70 attendant to this head 69 entering and leaving the same.

An L-shaped passage 75 comprises a horizontal bore 76 drilled inwardly from the left face 77 of the block 46, as viewed in Figure 15, and also comprises a vertical bore 78 drilled downwardly through the upper face 47 of said block. The upper end of the bore 78 communicates with the cover bore 57 through a vertical lateral 79 and thence through the cross bore 56 and a vertical tube 81, Figure 13, with a control chamber CH, in the upper end of the vertical bore 52, for a blocking valve controlling device 82, Figure 13. The upstream passage portion 75 is of restricted flow capacity because of a throttling plug 83, Figure 12, which is screwed into the upper end of the bore 78 of such passage, this plug 83 having a small orifice 84 therein protected against clogging by an elongated filtering hood 85.

In Figure 13 it can be seen that in the lower portion 66 of the bore 52 there is a valve seat member 86 and a valve ball 87 urged onto this seat by a spring 88. These parts constitute a fluid blocking valve 89. The blocking valve controlling device 82 normally holds the blocking valve 89 open so that fluid can by-pass at nominal pressure from the fluid delivery passage 49 throught the by-pass passages 65 and past the valve 89 into the exhaust passage 51. In Figure 15 it can be seen that the horizontal bore portion 76 of the passage 75 communicates with the fluid delivery passage 49 which receives fluid from the pump, as presently explained. Thus fluid at the pressure delivered by the pump is conducted upwardly through the upstream portion 75, of the control passage and through the filtering hood 85 and the throttling orifice 84 into the throttled downstream portion of the control passage including lateral 79, bores 57 and 56 and lateral 81 into the upper end of the control chamber CH. So long as fluid cannot escape from either of the control ports COX and COY, the unit pressure on the upper end of the controlling device plunger 91 will be the same as the unit pressure on the lower side of the valve ball. Since the area of the upper end of the plunger 91 exceeds the area of the ball 87, a unit pressure acting upon the upper end of the plunger equal to that acting upon the lower side of the ball 87 will prevail over the total force of pressure fluid upon the ball 87 and the force of the spring 88 for unseating the ball 87, even though the unit pressure of the fluid is a nominal pressure at which the fluid is by-passed through the opened blocking valve 89 from the by-pass passage to the exhaust passage 51.

Figure 2:
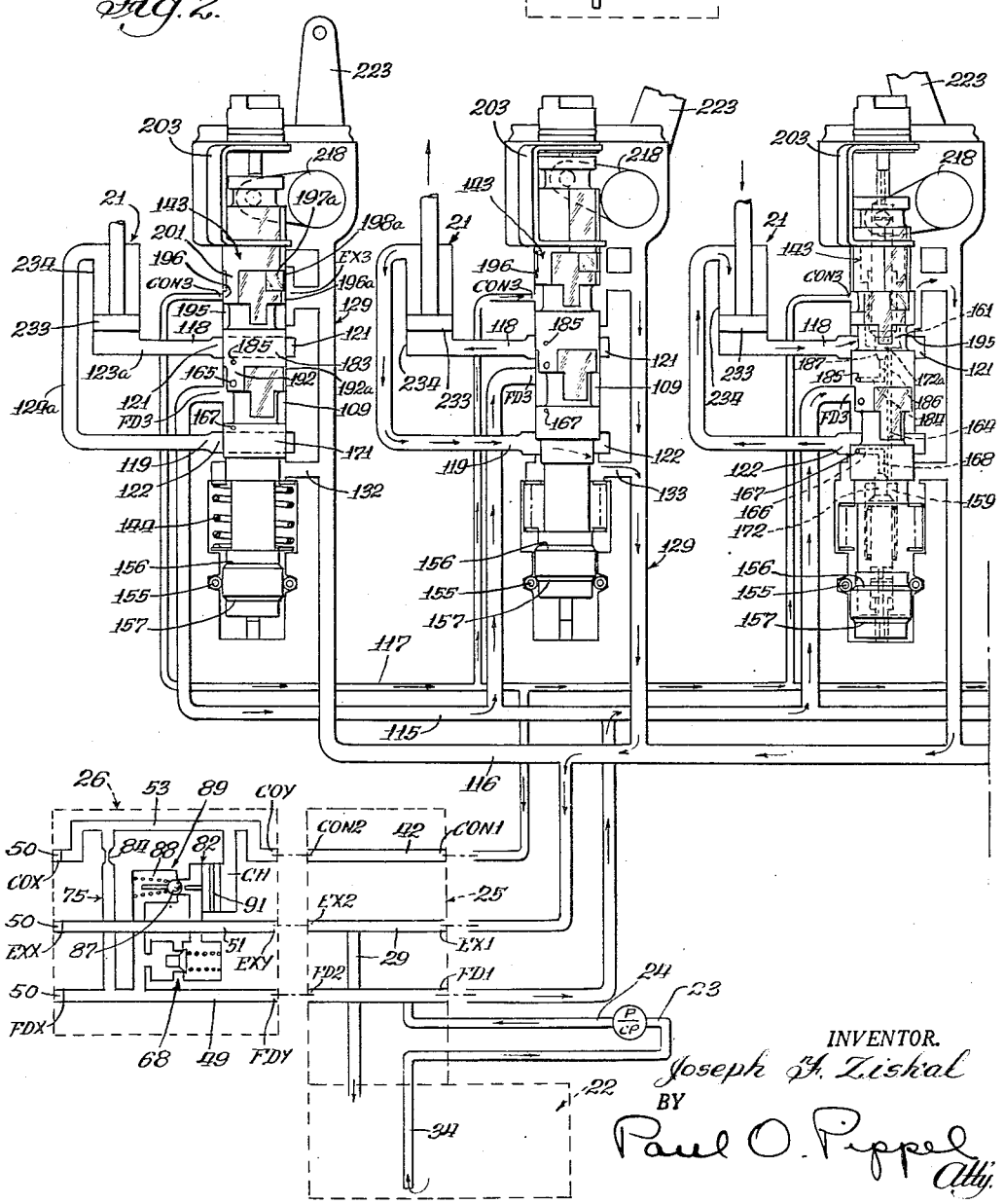
Figure 2A:
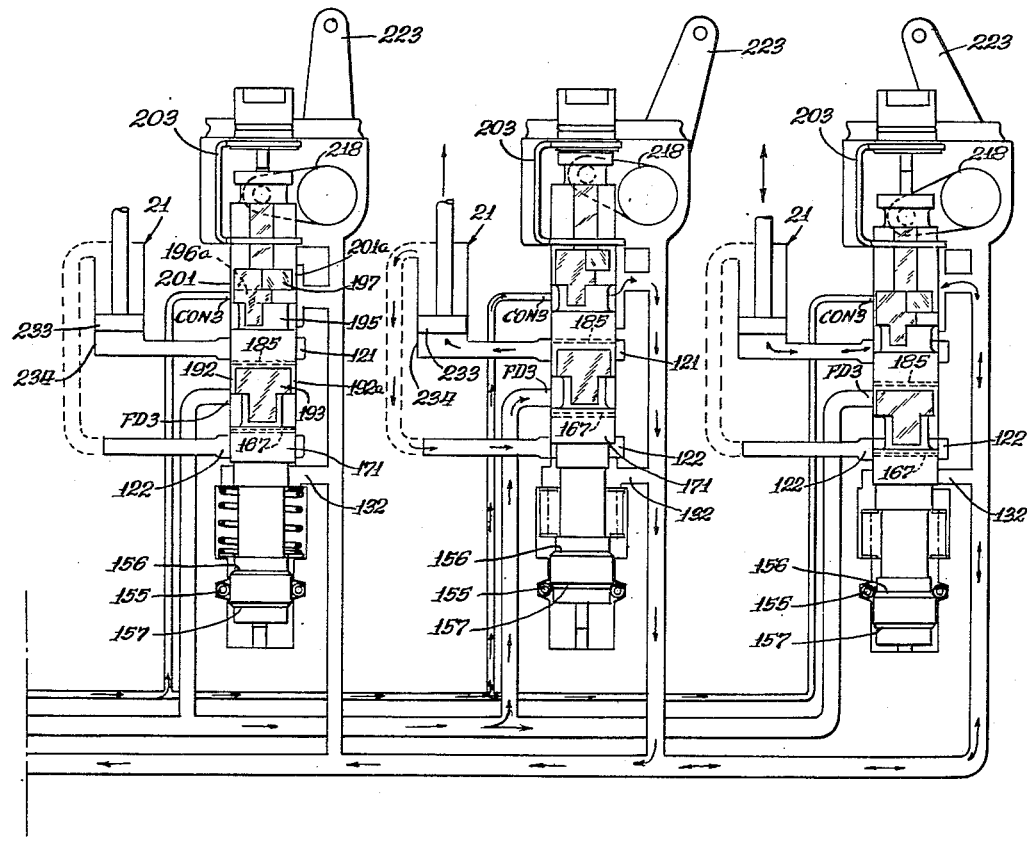

So long as the blocking valve 89 is open fluid cannot be delivered by the pump P at a pressure adequate for operating the hydraulic rams 21, Figures 2 and 2a. Closing of the blocking valve 89 is accomplished by allowing fluid to escape from the downstream portion of the control passage 75 through either of the ports COX or COY and this is done, as later explained, by any of the control valves CV attendant to it being moved from its neutral position to either operating position. When fluid is thus allowed to escape from the control passage 75 this drains off fluid from the control chamber CH above the blocking valve controlling device plunger 91 more rapidly than fluid can be supplied through the throttling orifice 84 which divides the upstream and downstream portions of the control passage 53. Consequently the unit pressure on the upper end of the plunger 91 will be less than the unit pressure on the lower side of the blocking valve ball 87 wherefor the spring 88 will be effective for closing the blocking valve 89.

The outer end of the bore 76 constituting a leg of the upstream passage portion 75 is closed at the block face 77 by a plug 92. The by-pass passage 65 which is formed by boring into the block 46 from the face 93 opposite the face 77 is closed at the end adjacent such face 93 by a plug 94. The outer ends of the intersecting bores 56 and 57 in the cap 48 are closed by plugs 95 and 96.

Details of the blocking valve controlling device 82 are described and claimed in U. S. Patent No. 2,625,177.

Structural details of the control valves CV will be understood from Figures 2, 2a and 6 through 11. In Figures 6 through 10 it can be seen that the control valve CV there illustrated comprises a casing 101, 103 including a bored and channelled block 101 generally parallelepiped in shape. This block 101 has a cavity 102 in its upper end closed by a cover 103 held in place by capscrews 104. A second cavity, 106, is in the lower end of the block 101 and this cavity is closed by a pressed metal cap 107 held in position by cap screws 108. A plunger-receiving bore 109 extends through the block between the cavities 102 and 106. The block 101 of each valve CV has a narrow vertical back face 111 and a vertical narrow forward face 112. Each block 101 also has a broad vertical reverse face 113 and an opposite broad vertical obverse face 114, as can be predetermined from Figures 3 and 7. A dotted outline of the reverse face 113 appears in Figure 6. Bolt-receiving holes 43b extending through the block 101 between the faces 113 and 114 are adapted to respectively register with the threaded recesses 43a in the obverse face OB1 of the manifold tower 25; see Figure 12. Holes 43b are adapted to receive the long capscrews 45, Figures 3 and 4, for mounting the block 101 onto the manifold tower with the reverse face 113 in flat sealed relation with the obverse face OB1. When the control valve block 101 is so mounted on the manifold tower, a fluid delivery passage 115 thereof registers communicatively with the fluid delivery port FD1 of the manifold tower whereas an exhaust passage 116 communicatively registers with the exhaust port EX1 of the manifold tower and a control passage 117 communicatively registers with the control port CON1 of the manifold tower. These passages 115, 116 and 117 are in the form of bores extending completely through the block 101 through the obverse and reverse faces 114 and 113. Passages 115, 116 and 117, respectively, communicate with the valve plunger receiving bore 109 through ports FD3, EX3 and CON3.

In the back face 111 of the valve block 101 is a pair of vertically spaced reversible flow passages 118 and 119 respectively communicating with annular reversible flow ports 121 and 122 circumscribing the plunger bore 109. Threaded enlarged outer ends 123 and 124 of these passages are adapted for connection with conduits 123a and 124a, Figure 2, leading to a ram 21 when such conduits are substituted for plugs 123b and 124b. In front face 112 threaded enlargements are provided for reversible flow passages 127 and 128 also communicating with the annular ports 121 and 122, and thus adapt the control valve for connection of a second ram 21 thereto. When either set of passages 118, 119 or 127, 128 has no ram connected therewith, such set of passages will be sealed closed by plugs as 123b and 124b. Exhaust passage means 129 includes the exhaust passage 116 and its ports EX3, Figures 7 and 9, as well as a vertical bore 131 closed at its upper end by a plug 133 and communicating at its lower end through a port 132 with the upper part of the casing chamber 106. Port 132 is formed by a bore 134 closed by a plug 135. The ports EX3 are formed by bores 136 closed by plugs 137. Control passage port CON3 is formed by a tool (not shown) extended through a bore 138 closed by plug 139, Figures 6, 7 and 9. Fluid delivery port FD3 is formed by a bore 141 closed by a plug 142, Figures 6, 8 and 10.

Slidably within the casing bore 109, Figure 6, is a valve plunger 143 movable endwise in either direction from the neutral position illustrated in Figure 6. A perspective view of this plunger appears in Figure 11. Sectional views of this plunger appear in Figures 7 through 10.

A helical spring 144 surrounding a lower end portion of the plunger 143 normally maintains it in the neutral position. The upper end of a cap 145 screwed onto a threaded lower end portion 146 of the plunger 143 serves as an abutment for a spring seat collar 147 which is slidable endwise on the valve plunger. A shoulder 148 of the plunger serves as an abutment stop for a spring seat collar 149 for the upper end of the spring 144 which is axially compressed between the collar seats while they are seated respectively against the cap 145 and the shoulder 148. The valve plunger may be moved downwardly from the neutral position attendant to displacing the spring seat collar 149 from a shoulder 151 near the upper end of the cavity 106 attendant to compressing the spring 144 and sliding the lower portion of the plunger downwardly through the collar 147. Upon release of force holding the plunger downwardly the compressed spring will be effective for returning the collar 149 against the shoulder 151 and thus returning the plunger to neutral. Upward movement of the valve plunger 143 from the neutral position causes the cap 145, which moves with the plunger, to displace the spring seat collar 147 upwardly from the upper end of a garter spring casing 152 attendant to compressing the spring 144 and sliding the plunger upwardly within the spring seat collar 149. Upon termination of force maintaining the plunger upwardly the spring 144 will be effective for returning the collar 147 against the upper end of the garter spring casing 152 and thus restoring the valve plunger to neutral.

Garter spring casing 152 which is clamped against a shoulder 153 in the casing cavity 106 by the closure cap 107 contains an annular cavity 154 for a contracting garter spring 155. When the valve plunger is moved downwardly from neutral into a full "on" position, an annular detent shoulder 156 thereon is carried downwardly far enough for the garter spring 155 to contract thereonto and thus serve as a detent means for preventing immediate return of the valve plunger to neutral despite termination of manual force employed for moving the valve plunger from neutral. Likewise, when the valve plunger is moved upwardly from neutral into a full "on" position a shoulder 157 thereon is carried sufficiently high for the garter spring 155 to clamp thereonto for releasably maintaining the valve plunger in its upward "on" position until a downward force is applied to the valve plunger for releasing this detent action of the spring 155 and the shoulder 157 to enable the spring 144 to return the plunger to neutral.

A central axial bore 158 in the valve plunger 143 communicates between a slender deep recess 159 in the lower end of such plunger and a similar recess 161 in the upper end of such plunger. A long slender plug 162 fits snugly into the plunger bore 158 in sealing relation with respect to its inner periphery excepting for a channel 164 formed lengthwise of and between this plug and a peripheral portion of the bore by a slender flat face 163 upon a side of the plug; see Figures 8 and 10. Channel 164 provides communication between the plunger lower and upper recesses 159 and 161. A pin 165 extending diametrically through the plunger 143 and the plug 162 prevents accidental disassembly of these parts.

A diametric bore 166 having end ports 167 extends through the valve plunger 143 and also through the plug 162 therein. This bore 166 intersects an axial bore 168 in the plug 162 and communicates through a valve seat 169 in the lower end of the plug. The ports 167 are in a cylindrical land 171 of the valve plunger. A poppet valve member 172 urged onto the seat 169 by a helical spring 173 has a stem portion 174 piloted within a bore 175 of a piston sleeve 176 slidable within a spring seat sleeve 177 for the spring 173. This piston sleeve has a reduced diameter end portion constituting a bumper head 178 slidable in a hole 179 of an abutment washer 181 for cooperation with a fixed abutment member 234 on the cap 107.

Above the cylindrical land 171 of the valve plunger 143 is an annular cavity 182 and above this cavity is a cylindrical land 183. A diametric bore 184 in the valve plunger has end ports 185 respectively communicating outwardly through the surface of the land 183. Bore 184 also extends diametrically through the plug 162 and intersects an axial bore 186 in such plug. Bore 186 communicates through a valve seat 187 in the upper end of the elongated plug 162. A poppet valve member 172a corresponds to the valve member 172 and cooperates with the valve seat 187 similarly to the valve member 172 with the valve seat 169. Other parts associated with the valve member 172a that correspond to those described above in association with the valve member 172 are designated by the same respective reference characters plus the suffix a.

Adjacent the lower edge 191 of the cylindrical valve plunger land 183 are diametrically opposite fluid-delivery-port masking lands 192, either of which is adapted to cooperate with the fluid delivery port FD3 for closing the same. However, only one of the lands will cooperate with the port FD3, depending upon whether the plunger is installed in the casing bore 109 in either of two 180° rotatively spaced positions in which it is installable. These port-masking lands 192 are formed by broaching away portions of the valve plunger incident to forming oposite parallel facets 193 and 193a thereon; also see Figures 8 and 9. Above the upper circular edge 194 of the plunger land 183 is an annular cavity 195 and above this cavity 195 are two diametrically opposite control-port-masking lands 196 and 196a, Figures 2, 6, 7 and 9. These lands are formed by broaching facets 197 and 197a spacedly above the plunger cavity 195. These facets 197 and 197a also form cavities 198 and 198a which are communicative with the plunger cavity 195 by virtue of facets 199 and 199a formed diametrically oppositely as illustrated in Figures 7 and 9. Control port masking tail surfaces 201 and 201a extend axially of the plunger upwardly from circumferential end portions of the port-masking lands 196 and 196a. The masking lands 196 and 196a as well as the masking tail surfaces 201 and 201a are alternatively cooperable with the control port CON3 depending upon which of the alternative 180° installation positions the valve plunger 143 occupies in the valve casing bore 109. When the valve plunger 143 is in neutral while installed in the rotative position illustrated, the land 196 is adapted to close the control port CON3. If the plunger is adjusted rotatively to bring the masking tail surface 201 into radial registry with the control port CON3 and the plunger is moved downwardly to bring the masking surface 201 into registry with such port, it will mask the same. The masking land 196a and the associated masking tail surface 201a are adapted to similarly cooperate with the control port CON3 should the valve plunger be installed in the other of its 180° rotatively spaced positions.

As can be seen in Figures 6a and 11, the upper end portion of the plunger 143 has diametrically opposite facets 200 and 200a. This upper end of the valve plunger is telescopically received in the lower leg 202 of a U-shaped connector 203. The plunger facets 200 and 200a respectively fit in sliding relation against opposite parallel straight edges 204 and 204a of an elongated opening 205 in the connector leg 202. The opening 205 and the upper end portion of the plunger 143 are symmetrical so the plunger can be disposed within the opening 205 in either of the above mentioned two 180° spaced rotative positions. Leg 206 of the connector 203 has an opening 207 shaped similarly to the opening 205 for receiving a head 208 of a stem 209 disposed rotatively in a hole 210 of the cover plate 103. Diametrically opposite and parallel straight edge portions 211 on the head 208 corresponding to the facets 200 and 200a on the upper portion of the valve plunger 143 cooperate with the straight sides (not shown) of the hole 207 for causing the connector 203 to rotate with the stem 209. In Figures 5 and 6 the stem 209 can be seen to have an operating pin 212 mounted therein to effect rotative adjustment of the stem 209 and consequently of the valve plunger 143 selectively between positions designated D and S in Figure 5. Bowed portions respectively constituting detent dwells 213 and 214 in a quadrant strip 215 secured to the upper side of the valve casing plate 103 respectively cooperate with the pin 212 for releasably maintaining the adjustment positions D and S thereof. When the pin 212 occupies position D the control valve plunger will be in a rotative position wherein it is operable to cause double acting of a two-way ram 21, Figures 2 and 2A, operatively connected therewith. When the pin 212 is set in position S the valve plunger will be in a rotative position causing the valve to be operable, when moved one way from neutral, for causing positive movement of the ram plunger in one direction only, while permitting the ram plunger to float endwise in the ram cylinder when the valve plunger is moved in the opposite direction from neutral.

Referring to Figure 6, in the cavity 102 at the upper end thereof there is a bearing boss 216 in rotative support of a shaft 217 which has a shifter fork 218 attached for rocking motion therewith. Each leg of the shifter fork 218, one leg 219 thereof being shown, carries a pin 221 which projects into a shifter groove 222 in the upper end of the valve plunger 143. Exteriorly of the casing block 101 an operating arm 223 is fixed to the shaft 217. In Figures 3 and 4 it can be seen that each of the control valves CV has such an operating arm 223. These operating arms 223 are pivotally connected by respective pins 224, Figure 4, with operating links 225, and the opposite ends of these links 225 are pivotally connected by pins 226, respectively, with the ends of arms 227 which are respectively fixed for rotation with operating shafts 228, 229 and 230, of which the shafts 229 and 230 are tubular. The outermost sleeve shaft 230 is journalled in a bearing bracket 231 comprising a portion of a cover plate 232 for the obverse face of the rightmost control valve CV shown in Figure 3. Control lever 18 fixed upon the right end of the shaft 228 is in control of the leftmost control valve CV whereas the lever 17 mounted on the right end of the tubular shaft 229 is in control of the center valve CV shown in Figure 3, whereas the control shaft 16 mounted upon the sleeve shaft 230 is in control of the rightmost control valve CV in Figure 3.

Figures 2 and 2a contain a diagrammatic illustration of the system and wherein there are shown six control valves CV respectively set in and demonstrating the six possible adjustment positions for each valve. Each of the three valves in Figure 2 is set for two-way operation of the hydraulic rams 21 respectively associated therewith. That is, the valve plunger 143 is rotated to the position D shown in Fig. 5. The leftmost control valve in Fig. 2 has the plunger 143 set in its neutral position in an axial direction, whereas the center valve has the plunger raised from neutral for causing fluid to be introduced under pressure into the head end of the hydraulic ram 21, and the rightmost valve is set with the plunger below the neutral position for causing delivery of fluid under pressure to the rod end of the hydraulic ram 21.

In Figure 2a the valve plungers are set in the rotative position to cause single acting operation of the two-way rams 21 respectively associated therewith, this being the setting designated S in Figure 5. The leftmost control valve in Figure 2a is set in the neutral position in an axial direction, whereas the center valve is set with the plunger raised from the neutral position to cause pressure delivery of fluid to the head end of the associated ram 21, and the rightmost ram is set with the plunger below the neutral position to connect the head end of the ram 21 with the exhaust passage and thereby permit pumping action of the ram piston between limits respectively at the head end of the ram cylinder 234 and the positions spaced axially of the cylinder from the cylinder head and to which the piston 233 had occupied at the time of setting the valve plunger in the lowered position.

Referring now to the leftmost control valve in Figure 2, where the plunger 143 is set in the double acting position D of Figure 5 and is also disposed in the neutral position vertically, the plunger land 196 covers the control port CON3 so that this valve is inoperable to allow escape of fluid from the chamber CH of the blocking valve controlling device 82 of the pressure controlling unit 26 wherefor the blocking valve 89 remains open and the fluid from the pump P by-passes at low pressure. Also, the valve plunger lands 183 and 171 respectively block the annular ports 121 and 122 for hydraulically locking the fluid against escape from either end of the ram 21 so the plunger 233 thereof is held against axial movement. The lands 183 and 171 also prevent communication of the fluid delivery port FD3 with either of the ports 121 and 122.

When it is desired to raise the ram plunger 233 for lifting a tillage tool or the like which may be attached to the tractor, the valve plunger 143 will be raised from its neutral position, as shown in the center valve CV of Figure 2. This is done manually by rocking the arm 223 and rotating the shifter fork 218 clockwise. When the valve plunger reaches its uppermost position the garter spring 155 will contract onto the shoulder 157 for yieldably maintaining the plunger raised so the operator will not need to maintain manual force against the lever 223 for holding the valve in its operating position. As the valve plunger is raised the land 196 first uncovers the control port CON3 wherefore fluid can flow from the chamber CH of the blocking valve controlling device 82 to permit closing of the valve 89 under the force of the spring 88 and the pressure of fluid in the passage 65. Since the fluid from the pump P can then no longer by-pass through the fluid delivery passages 41, 49, the by-pass 65, the blocking valve 89 and the exhaust passages 51 and 29 into the reservoir, this fluid delivered by the pump will then be pressurized in the fluid delivery passage 115 and the port FD3 of the valve CV for delivery through the passage 118 to the head end of the ram 21 for forcing the plunger 233 upwardly. Concurrently fluid is exhausted from the rod end of the ram 21 through the passage 119 and the annular port 122; the exhaust port 133 and the exhaust passage means 129 including the passage 116 back to the reservoir.

When the ram plunger 233 reaches the upper end of its stroke there will be an increase of pressure in the annular port 121 to a degree that fluid in the L-shaped passage 184, 186, of which the port 185 communicates with the port 121, will be sufficient to unseat the poppet valve member 172a; see the rightmost valve in Fig. 2 and Fig. 6. Fluid thus allowed to pass the valve seat 187 into the recess 161 flows axially downwardly through the valve plunger passage 164; see the rightmost valve plunger in Figure 2 where passage 164 is diagrammatically illustrated, and also see Figures 8 and 10. Fluid thus reaching the chamber 159 in the lower end of the valve plunger, Figure 6 and the rightmost valve of Figure 2, forces the piston sleeve 176 downwardly against the stop washer 181, this being the position illustrated in Figure 6. The fluid pressure then building up in the recess 161 in the upper end of the valve plunger 143 now pushes upwardly on the piston sleeve 176a which had been forced axially downwardly into the recess 161 when its bumper head 178a had abutted against a stop member 234a projecting downwardly from the stem 209, when the valve plunger was raised from neutral. Fluid pressure in the recess 161 pushing upwardly on the sleeve piston 176a after the head 178a abuts the stop 234a reacts downwardly upon the plunger to push the shoulder 157 below the garter spring 155 wherefore this detent device is no longer effective and the spring 144 centers the valve plunger in neutral. Upon return of the valve plunger to neutral, as illustrated in the lefthand valve of Figure 2, the valve plunger lands 183 and 171 will again block the reversible flow ports 121 and 122 for hydraulically locking the ram 21 for maintaining the ram plunger 233 in the position to which it has been moved.

Should the operator desire to stop movement of the ram plunger 233 before it reaches the end of its stroke to automatically cause the valve plunger to return to neutral, the operator may manually return the valve plunger to neutral.

When it is desired to move the ram plunger 233 in the opposite direction manual force is applied to the lever 223 for moving the valve plunger 143 downwardly as shown in the right hand valve of Fig. 2. The valve plunger land 196 then uncovers the control port CON3 to cause closing of the blocking valve 89 of the pressure controlling unit 26, as previously described, so that fluid under pressure is delivered through the delivery passage 115 and the fluid delivery port FD3 which is then communicative with the reversible flow port 122 from which fluid flows to the rod end of the ram 21 for forcing the plunger downwardly. Concurrently fluid is exhausted from the lower end of the ram to the valve reversible flow port 121 and thence through the valve plunger cavities 195 and 198 to the exhaust port EX3. This fluid escapes back to the reservoir through the exhaust passage 116. When the ram plunger 233 reaches the bottom of its stroke pressure will build up in the reversible flow port 122 for forcing fluid inwardly through the port 167 of L-shaped pasasge 166, 168; see Fig. 6. This increased pressure of fluid will unseat the valve member 172 and allow the fluid to flow into the recess 159 in the lower end of the plunger. From the recesss 159 the fluid first flows upwardly through the axial passage 164 into the recess 161 at the upper end of the valve plunger for urging the sleeve piston 176a upwardly in its seated relation against the washer 181a as illustrated in Fig. 6. Thereupon the pressure in the recess 159 at the lower end of the valve plunger will build up sufficiently to force the piston sleeve 176 downwardly against the abutment member 234 and thereby react upwardly against upper end of the plunger recess 159 to force the valve plunger upwardly to carry the detent shoulder 156 above the garter spring 155 and thus place the valve plunger under control of its centering spring 144 for return to neutral. The valve plunger will then be operable as illustrated in the left hand valve of Fig. 2 for hydraulically locking the ram plunger 233 against movement.

Referring now to the leftmost valve in Fig. 2a wherein the valve plunger 143 has been rotated slightly clockwise as viewed from above to shift it from the position D to position S of Fig. 5, for placing the masking tail 201 in axial alignment with the control port CON3 and placing the masking surface 192 in axial alignment with the fluid delivery port FD3. This has no effect upon the valve while it is in the neutral position shown for it will still function as in the case of the leftmost valve in Fig. 2 to block the control passage CON3 and to block the reversible flow ports 121 and 122 to hydraulically lock the ram plunger 233.

Neither does this adjustment of the valve plunger rotatively into the single acting position S of Fig. 5 cause operation of the valve to differ when the plunger is moved upwardly as shown in the center valve of Fig. 2, for in each of these instances the upwardly moved valve plunger land 196 will uncover the control port CON3 for causing delivery of fluid under pressure to the fluid delivery port FD3, and this fluid will be delivered through the reversible flow port 121 to the lower end of the ram 21 for forcing the plunger 233 upwardly while fluid exhausts from the rod end of the ram through the reversible flow port 122 and the exhaust port 132. When the ram plunger 233 associated with the center valve of Fig. 2a reaches the upper end of its stroke, fluid entering the valve plunger through the port 185 of passage 184, 186 will function as explained in connection with the center valve of Fig. 2 to return the valve plunger to neutral.

Normally the ram 21 will be so connected with a tillage implement on the tractor that movement of the plunger 233 upwardly will raise the implement whereas movement of the plunger downwardly causes the implement to descend, and forcing the plunger downwardly will cause the implement to penetrate the soil. Sometimes it is desirable not to force the implement into the soil nor resist movement of the implement up and down as it "floats" over the ground surface. When the valve plunger is rotated into the single acting position S indicated by the legend S in Fig. 5 and shifted downwardly from its neutral position illustrated in the right hand valve of Fig. 2A, the hydraulic ram 21 is relieved of fluid pressure to enable its plunger 233 to move freely in either direction so that an implement to which it is attached can move up and down in accordance with ground contour without impediment because of its attachment to the ram plunger. In Fig. 2A wherein the plunger has been moved downwardly and held by the garter spring engaging the plunger shoulder 156, the masking tail 201 of the masking land 196 masks the control port CON3. As a consequence this valve will be ineffective for causing the system to go on high pressure. Also, the masking surface 192 immediately below the valve plunger land 183 then is disposed in registry with the fluid delivery port FD3 and thus isolates this valve from fluid pressure in the event that any of the other valves is conditioned for initiating the high pressure condition. However, the plunger cavities 195 and 198 establish communication between the reversible flow port 121 and the exhaust port EX3 wherefore the ram plunger 253 can descend to the bottom of its stroke and can move upwardly without encountering resistance of fluid, to the position the ram plunger had occupied at the time the valve plunger was moved down from neutral. And, since the fluid delivery port FD3 is masked by the valve port masking surface 192 no fluid will be admitted to the valve and consequently no fluid pressure will be incurred in the reversible flow port 122 sufficiently high to enter the valve plunger port 167 to unseat the poppet valve member 172 for returning the valve plunger to neutral. Consequently, this floating condition will prevail until the valve is manually returned to neutral.

Figure 2b illustrates how the pressure controlling unit 26 can be removed from the obverse face OB2 of the manifold tower 25 and assembled in stacked relation between the obverse face OB1 of such tower and the control valves CV, with the reverse face REV of the pressure controlling unit against the tower face OB1 and with the pressure controlling unit obverse face OBV disposed for the mounting of the reverse face 113 of the leftmost control valve CV thereon. Attendant to this rearrangement of parts, the plugs 50 will be removed from the pressure controlling unit ports COX, EXX and FDX, and plugs 50a will be placed in the ports CON2, EX2 and FD2 of the tower. This rearrangement of the pressure controlling unit does not affect the mode of operation explained above.

Having thus described a single preferred embodiment of the invention with the view of clearly and concisely illustrating the same, I claim:

1. In a hydraulic control system for a hydraulic ram; the combination of a manifold structure containing a fluid delivery passage, a control passage, and an exhaust passage; a fluid pressure controlling unit mounted on said manifold structure, said pressure controlling unit having a control passage of restricted flow capacity communicating between the fluid delivery and control passages of the manifold structure and also having a by-pass passage communicating between the fluid delivery and exhaust passages of the manifold structure, and such unit comprising a fluid blocking valve in the by-pass passage, and a blocking valve controlling device communicated with by the control passage and operable responsively to pressure change of fluid in such control passage to open the blocking valve when the control passage is closed and to cause closing of the blocking valve when the control passage is vented; and a control valve unit including a casing having obverse and reverse faces containing respective sets of ports of which each set includes a control port, an exhaust port and a fluid delivery port, the unit being mounted on a side of the manifold structure to place the reverse face toward such structure and to expose the obverse face, the ports being arranged in such a pattern of relative position that should the reverse face of an identical casing be placed oppositely against the exposed obverse face the corresponding ports of these opposed faces would communicatively register, the valve casing also having a control passage communicating between its control ports and communicating through the reverse face control port and the manifold structure control passage with the control passage of the pressure controlling unit, an exhaust passage communicating between such valve casing exhaust ports and communicating through the reverse face exhaust port with the manifold structure exhaust passage, a fluid delivery passage communicating between such valve casing delivery ports and communicating through the reverse face delivery port with the manifold structure delivery passage, and reversible flow passages, respectively communicable with opposite ends of the hydraulic ram, means replaceably closing the obverse face ports, and said control valve also including a control element selectively adjustable oppositely from a "neutral" position wherein it blocks the reversible flow passages and the control passage of the valve to respective opposite "on" positions in each of which the control element establishes a drain communication between the control passages and the exhaust passages, the valve control element being operable in one of the "on" positions to establish communication between the delivery passages and one of the reversible flow passages while establishing communication between the exhaust passages and the other reversible flow passage, and being operable in the other "on" position to transpose said communications of the reversible flow passages.

2. In a hydraulic control system for a hydraulic ram; the combination of a manifold structure containing a fluid delivery passage, and an exhaust passage; a fluid pressure controlling unit mounted on said manifold structure, said pressure controlling unit having a by-pass passage communicating between the fluid delivery and exhaust passages of the manifold structure and also having a control passage of restricted flow capacity with an upstream portion communicative with the fluid delivery passage for receiving fluid therefrom for such control passage and having a downstream portion wherein fluid pressure is undiminished with respect to that in the fluid delivery passage while the fluid is static in the control passage but is diminished if fluid is allowed to flow downstream through such control passage, said pressure controlling unit comprising a fluid blocking valve in the by-pass passage, and a blocking valve controlling device subjected to the pressure of fluid in such downstream passage portion, one of said undiminished and diminished pressures of the downstream passage portion being of blocking magnitude to which the blocking valve controlling device is responsively operable to cause closing of the blocking valve and the other of said pressures being of unblocking magnitude to which said device is responsively operable to cause opening of the blocking valve; and a control valve unit including a casing having obverse and reverse faces containing respective sets of ports of which each set includes a control port, an exhaust port and a fluid delivery port, the unit being mounted on the manifold structure to place the reverse face toward said structure and to expose the obverse face, the ports being arranged in such a pattern of relative position that should the reverse face of an identical valve casing be placed oppositely against the exposed obverse face the corresponding ports of the opposed faces would communicatively register, the valve casing also having a control passage communicating between its control ports and communicating through the reverse face control port with the downstream control passage portion, an exhaust passage communicating between such valve casing exhaust ports and communicating through the reverse face exhaust port with the manifold structure exhaust passage, a fluid delivery passage communicating between such valve casing delivery ports and communicating through the reverse face delivery port with the manifold structure delivery passage, and reversible flow passages respectively communicable with opposite ends of the hydraulic ram, means replaceably closing the obverse face ports, and said control valve unit also including a control element adjustable from a "neutral" position wherein it blocks the reversible flow passages of the valve unit to respective "on" positions to selectively communicatively connect the reversible flow ports with the fluid delivery and exhaust passages of the valve unit for obtaining different operations of the ram, and the control element being cooperable with the control and exhaust passages of the valve unit to subject the blocking valve controlling device to an unblocking pressure for causing opening of the blocking valve when said element is in "neutral" and to subject such device to a blocking pressure for causing closing of the blocking valve when said element is in at least one of the "on" positions.

3. In a hydraulic control system for a hydraulic ram; the combination of a manifold structure containing a fluid delivery passage, a control passage, and an exhaust passage, there being a plurality of sets of side wall ports for said passages, the ports of each set being within a common side wall of the manifold structure and each set of ports respectively containing a fluid delivery port, a control port and an exhaust port respectively for the delivery passage, the control passage and the exhaust passage; a fluid pressure controlling unit mounted on a side of said manifold structure and having a set of ports including a fluid delivery port, a control port and an exhaust port respectively registering communicatively with the corresponding ports in one of the port sets of the manifold structure, said fluid pressure controlling unit including a control passage communicating between the delivery port and the control port thereof and such passage containing a throttling portion to diminish the pressure of fluid at the control port with respect to that of the delivery port when fluid is allowed to escape from the control port, said fluid pressure controlling unit also including a by-pass passage communicating between the delivery port and the exhaust port thereof, a fluid blocking valve in the by-pass passage, and a blocking valve controlling device communicative with the control port of such pressure controlling unit and operable in accordance with the pressure of fluid impressed thereon at such control port to determine the "open" or "closed" condition of the blocking valve; and a control valve unit mounted on a side of said manifold structure and having obverse and reverse faces of which each contains a set of ports including a delivery port, a control port and an exhaust port, the reverse face ports respectively registering communicatively with the corresponding ports in another set of the ports of the manifold structure, the valve unit having a control passage communicating between the control ports in said faces, an exhaust passage communicating between the exhaust ports in said faces, and a delivery passage communicating between the delivery ports in said faces, said port sets having correlated patterns of relative position such that should the reverse face of an identical unit be placed opposedly against the obverse face of the manifold-mounted unit the corresponding ports of these opposed faces would communicatively register, means replaceably closing the obverse face ports, said control valve unit also having reversible flow passages for communicative connection with opposite ends of the hydraulic ram, and comprising a control element movable to an "on" position from a "neutral" position wherein it blocks communication of such reversible flow passages with the delivery and exhaust ports of such valve unit, the control element being operable in the "on" position to connect the fluid delivery port of such valve unit with one of the reversible flow passages and to connect the other reversible flow passage with the exhaust port of such valve unit, and the valve element being cooperable with the control port of the valve unit and said control passages of the manifold and fluid pressure controlling unit to subject the blocking valve controlling device to an unblocking pressure for determining the "open" condition of the blocking valve when said element is in "neutral" and to a blocking pressure determining the "closed" condition of the blocking valve when said element connects the valve unit delivery port with the reversible flow port.

4. In a hydraulic control system for a hydraulic ram; the combination of a manifold structure containing a fluid delivery passage, an exhaust passage, and delivery and exhaust ports respectively for said passages and communicating through a face of such structure; a multifaced fluid pressure controlling unit having a first face mounted on and against said manifold structure face, said first face containing fluid delivery and exhaust ports respectively communicating with the delivery and exhaust ports of the manifold structure, a second face of the pressure controlling unit containing a fluid delivery port, an exhaust port and a control port, said unit having a fluid delivery passage communicatively between the delivery ports thereof, an exhaust passage communicating between the exhaust ports thereof, a control passage communicating between the delivery passage thereof and the control port and containing a throttling portion to diminish the pressure of fluid at the control port with respect to that at the delivery passage when fluid is allowed to escape from the control port, said fluid pressure controlling unit also having a by-pass passage communicating between the delivery passage and the exhaust port thereof and including a fluid blocking valve in such by-pass passage, and a blocking valve controlling device communicative with said control port and operable in accordance with the pressure of fluid impressed thereon at the control port to determine the "open," or "closed" condition of the blocking valve; and a control valve unit mounted on the second face of the pressure controlling unit and having obverse and reverse faces of which each contains a set of ports including a delivery port, an exhaust port, and a control port, the reverse face ports being respectively in communicative registry with the corresponding ports in the second face of the pressure controlling unit, the valve unit having a control passage communicating between the control ports in said faces, an exhaust passage communicating between the exhaust ports in said faces, and a delivery passage communicating between the delivery ports in said faces, said port sets having correlated patterns of relative position such that should the reverse face of an identical unit be placed opposedly against the obverse face of the manifold-mounted unit the corresponding ports of these opposed faces would communicatively register, means replaceably closing the obverse face ports, said control valve unit also having reversible flow passages for communicative connection with opposite ends of the hydraulic ram, and comprising a control element movable to an "on" position from a "neutral" position wherein it blocks communication of such reversible flow passages with the delivery and exhaust ports of such valve unit, the control element being operable in the "on" position to connect the fluid delivery port of such valve unit with one of the reversible flow passages and to connect the other reversible flow passage with the exhaust port of such valve unit, and the valve element being cooperable with the control port of the valve unit and said control passage of the fluid pressure controlling unit to subject the blocking valve controlling device to an unblocking pressure for determining the "open" condition of the blocking valve when said element is in "neutral" and to a blocking pressure determining the "closed" condition of the blocking valve when said element connects the valve unit delivery port with the reversible flow port.

5. In a hydraulic control system for a hydraulic ram; the combination of a manifold structure having a plurality of faces of which at least one is an obverse face, said structure containing a fluid delivery passage, a control passage and an exhaust passage, there being a plurality of sets of ports for said passages, the ports of each set being within a respective common face of such structure and each set of ports respectively containing a fluid delivery port, a control port and an exhaust port respectively communicating with the delivery passage, the control passage and the exhaust passage, one set of said ports being arranged in an obverse pattern within the obverse face; a fluid pressure controlling unit having reverse and obverse faces each having a set of ports including a fluid delivery port, a control port and an exhaust port and the ports within such reverse face being laid out in a pattern reverse to the pattern of ports in the obverse face of the manifold structure wherefore when the reverse face of the pressure controlling unit is placed against the obverse face of such manifold structure the corresponding ports of such faces will communicatively register, and the pattern of ports in the obverse face of said pressure controlling unit also being an obverse pattern identical with that in the obverse face of the manifold structure, said fluid pressure controlling unit including a control passage communicating between the delivery ports thereof and the control ports thereof and such passage containing a throttling portion to diminish the pressure of fluid at the control ports with respect to that at the delivery ports when fluid is allowed to escape from either of the control ports, said fluid pressure controlling unit also including a by-pass passage communicating between the delivery ports and the exhaust ports thereof, a fluid blocking valve in the by-pass passage, and a blocking valve controlling device communicative with the control ports of such pressure controling unit and operable in accordance with the pressure of fluid impressed thereon at such control ports to determine the "open" or "closed" condition of the blocking valve; and a control valve unit having a reverse face with a set of ports therein including a delivery port, a control port and an exhaust port respectively communicatively registrable with the corresponding ports in the obverse faces of the pressure controlling unit or the manifold structure whereby the control valve unit can be mounted with its reverse face directly on the obverse face of the manifold structure or alternatively on the obverse face of the pressure controlling unit when the latter is interposed between the manifold structure and said control valve unit, said control valve unit also having reversible flow passages for communicative connection with opposite ends of the hydraulic ram, and comprising a control element movable to an "on" position from a "neutral" position wherein it blocks communication of such reversible flow passages with the delivery and exhaust ports of such valve unit, the control element being operable in the "on" position to connect the fluid delivery port of such valve unit with one of the reversible flow passages and to connect the other reversible flow passage with the exhaust port of such a valve unit and to transpose the connections of the reversible flow passages of said delivery and exhaust ports when the control element is in the other "on" position, and the valve element being cooperable with the control port of the valve unit to subject the blocking valve controlling device to an unblocking pressure for determining the "open" condition of the blocking valve when said element is in "neutral" and to subject said device to a blocking pressure determining the "closed" condition of the blocking valve when said element connects the valve unit delivery port with at least one of the reversible flow ports, and the pattern of ports in one of the faces of the pressure controlling unit being adapted to respectively communicatively register with the corresponding ports in another face of the manifold structure when such pressure controlling unit is assembled with such faces together as an alternative to the pressure controlling unit being interposed between the obverse face of the manifold structure and the reverse face of the control valve unit.

6. In a pressure controlling unit, a body structure having obverse and reverse faces disposed oppositely from one another, each face containing a set of ports including a fluid delivery port, an exhaust port and a control port, such ports in each set being directly opposite the corresponding ports in the other set wherefore reverse face ports of one such unit will respectively communicatively register with the obverse face ports in another of such units should the units be assembled with the reverse face of the one against the obverse face of the other, said body structure having a fluid delivery passage communicating between the fluid delivery ports, an exhaust passage communicating between the exhaust ports, and a restricted flow capacity control passage communicating between the delivery passage and the control ports, the control passage being for the conduction of fluid in a downstream direction from the delivery passage and such passage having a downstream portion communicating between the control ports and wherein the pressure is greater when the fluid is static than when flowing, the body structure also having a by-pass passage communicating between the delivery passage and the exhaust passage, a fluid blocking valve in the by-pass passage, and a blocking valve controlling device communicative with said downstream portion of the control passage and operable in accordance with the pressure of fluid impressed thereon from such downstream portion to determine the "open" or "closed" condition of the blocking valve.

7. In a pressure controlling unit; a body structure comprising a main body portion having an upper face, and a cap portion having an under face disposed upon said upper face, said main body portion having obverse and reverse faces disposed oppositely from one another and extending downwardly with respect to said upper face, each oppositely disposed face containing a set of ports including a fluid delivery port, an exhaust port, and a control port, such ports in each set being directly opposite the corresponding ports in the other set wherefore reverse face ports of one such unit will respectively communicatively register with the obverse face ports in another of such units should the units be assembled with the reverse face of the one against the obverse face of the other, said main body portion having a fluid delivery passage communicating between the fluid delivery ports, an exhaust passage communicating between the exhaust ports, a by-pass passage communicating between the delivery passage and the exhaust passage, and a valve-controlling-device-receiving c h a m b e r communicating downwardly through the upper face of said body portion with the exhaust passage and with the by-pass passage; a fluid blocking valve in the by-pass passage; a blocking valve controlling device in said chamber and operable in accordance with pressure of fluid in such chamber to determine the "open" or "closed" condition of the blocking valve, said body structure having a control passage, the main body portion containing an upstream portion of said control passage communicating from the fluid delivery passage upwardly through the upper face of said body portion and being of restrictive flow capacity, said control passage also comprising a downstream portion of which a part is formed in said cap and communicates with said upstream portion, said downstream portion of the control passage including vertical leg parts in the main body portion respectively communicating with the control ports and extending upwardly through the upper face of the main body portion into communication with the part of the downstream portion of such control passage formed in said cap, and said downstream portion of the control passage having a port communicating downwardly through the under face of such cap with said control chamber.

8. In a valve for controlling the operation of a two-way hydraulic ram by means of fluid delivered from a source which delivers at by-pass pressure when the flow of fluid is blocked from a control port thereof and which is adapted to deliver fluid at a higher pressure when the flow of fluid from such port is unblocked; the combination of a casing having a plunger-receiving bore, reversible flow ports communicating with said bore and spaced axially thereof for respective communication with opposite ends of the ram, a delivery port for receiving fluid from said source, a control port for communication with the source control port, and exhaust port means; and a plunger adjustable rotatively in such bore and also adjustable endwise oppositely in such bore from a central neutral position, said plunger having reversible-flow-port lands respectively disposed in blocking relation with the reversible flow ports when the plunger is in neutral, a control port land in blocking relation with the control port when the plunger is in neutral, exhaust cavity means, and delivery cavity means, said plunger being operable when in one rotative adjustment to dispose the control port land out of blocking relation with the control port when adjusted in either axial direction from neutral and concurrently establish the exhaust cavity means communicatively between the control port and the exhaust port means, the plunger also being operable while in the one rotative adjustment and while in one axial direction from neutral to dispose the delivery cavity means communicatively between the delivery port and one of the reversible flow ports while disposing the exhaust cavity means communicatively between the other reversible flow port and the exhaust port means and to transpose the communications of the delivery cavity means and exhaust cavity means when the plunger is disposed in the other direction from neutral, the plunger also having a delivery port masking land and the control port land having a port masking tail extending axially of the plunger, said masking land and masking tail being respectively disposed out of alignment with the delivery port and control port axially of the plunger while the plunger is in the one rotative adjustment but being in such alignment while the plunger is in another rotative adjustment, the plunger being operable while in such other rotative adjustment to dispose the port masking tail in blocking relation with the control port and the delivery port masking land in blocking relation with the delivery port when the plunger is in said other axial direction from neutral but not to place the masking land and masking tail in such blocking relations when the plunger is in the one axial direction from neutral.

9. In a valve for controlling the operation of a two-way hydraulic ram by means of fluid delivered from a source, the combination of a casing having a plunger-receiving bore, reversible flow ports communicating with said bore and spaced axially thereof for respective communication with opposite ends of the ram, a delivery port for receiving fluid from said source, and exhaust port means; and a plunger adjustable rotatively in said bore and also adjustable endwise oppositely in such bore from a central neutral position, said plunger being operable when in one rotative position and attendant to adjustment in one endwise direction from neutral to establish communication between said delivery port and one of the reversible flow ports concurrently with the establishment of communication between the other reversible flow port and said exhaust port means, the plunger also being operable while in the one rotative position and when adjusted in the opposite direction from neutral to transpose the communication of the reversible flow ports with the fluid delivery port and the exhaust port means, and the plunger including a port-masking land disposed in alignment with the fluid delivery port axially of such plunger when the plunger is rotated to occupy another rotative position, and the port-masking land of such rotated plunger being adapted to mask the fluid delivery port attendant to adjustment of the plunger axially in one direction from neutral.

10. The combination set forth in claim 9 wherein the valve is for controlling the flow of fluid from such source which delivers fluid at bypass pressure when the flow of fluid from a control port of such source is blocked and which source is adapted to deliver fluid at a higher pressure when the flow of fluid from such port is unblocked, wherein the valve casing has a control port for communication with the control port of the source and communicative with the bore in such casing, wherein the valve plunger has a control port masking means adapted to register in masking relation with the casing control port when the valve plunger is in neutral but adapted to uncover the control port and establish communication between such control port and the exhaust port means of the valve casing attendant to movement of the plunger in either direction from neutral while the plunger is in the one rotative position, and wherein the valve plunger has port masking means adapted during rotative adjustment of the valve plunger into the other rotative position to mask the control port when the plunger is moved endwise in the one direction incurring masking of the fluid delivery port by the port masking land.

11. In a valve for controlling the operation of a two-way hydraulic ram by means of fluid delivered from a source which delivers fluid at bypass pressure when the fluid is blocked from a control port thereof and which is adapted to deliver fluid at a higher pressure when the flow of fluid from such port is unblocked; the combination of a casing having a plunger-receiving bore, reversible flow ports communicating with said bore and spaced axially thereof for respective communication with opposite ends of the ram, a delivery port for receiving fluid from said source, a control port for communication with the source control port, and exhaust port means; and a plunger adjustable rotatively in such bore and also adjustable axially oppositely in such bore from a central neutral position, the plunger being operable while in the neutral position to block communication through the casing bore between the delivery port and each of the reversible flow ports, said plunger being operable while in one rotative position when moved in one endwise direction from neutral to establish communication between the fluid delivery port and one of the reversible flow ports concurrently with establishing communication between the other reversible flow port and the exhaust port means, said plunger also being operable while in the one rotative position when adjusted in the opposite direction from neutral to transpose the communicative connections between the reversible flow ports and the fluid delivery port and exhaust port means, and the plunger including control port masking means movable both rotatively and axially therewith and in such position thereon that it is adapted to mask the valve casing control port when the plunger is in neutral and to unmask such control port when the plunger is adjusted in either endwise direction from neutral while in the one rotative position, and such control port masking means being also adapted to mask the valve casing control port when the plunger is in one of its endwise adjustable positions while in the other rotative position.

12. The combination set forth in claim 11, wherein the plunger comprises delivery port masking means adapted to block the delivery port while the plunger is in said endwise position and in said other rotative position.

13. In a control valve, a casing having a plunger-receiving bore, a fluid delivery port communicative with said bore, reversible flow ports spaced apart axially of said bore and communicative therewith, and exhaust port means communicative with said bore; a valve plunger adjustable endwise oppositely in said bore from a neutral position wherein such plunger is adapted to block communication between the fluid delivery port and the reversible flow ports, the plunger being operable when in one endwise position from the neutral to establish communication between the fluid delivery port and one of the reversible flow ports concurrently with establishing communication between the other reversible flow port and the exhaust port means, the plunger being operable when in the opposite direction from neutral to transpose the connections between the reversible flow ports and the fluid delivery port and exhaust port means; detent means for releasably retaining the plunger in either position from the neutral; centering spring means reactable between the casing and the plunger and operable to dispose the plunger in the neutral position upon release of the plunger by the detent means, bumper elements at respective ends of the casing plunger-receiving bore, the plunger including piston-receiving recesses respectively at its ends and poppet valve seats respectively in the inner ends of said recesses, poppet valve members respectively yieldably seated on the valve seats, piston members respectively in the piston-receiving recesses, stop means limiting movement of the pistons endwise outwardly of the recesses, each of said pistons having a bumper head adapted to bump against the pumper element at the corresponding end of the casing, said pistons being forceable outwardly of their recesses against their associated stop means attendant to introduction of fluid under pressure into their recesses, channel means communicating between said recesses, and channel means communicating between the valve seats and respective ports in the plunger, one of said ports being communicative with the fluid delivery port when the valve plunger is moved in one direction from neutral and the other of said ports being communicative with the fluid delivery port when the valve plunger is in the other position from neutral.

References Cited in the file of this patent

UNITED STATES PATENTS

| | | |
|---|---|---|
| 2,342,450 | Campbell | Feb. 22, 1944 |
| 2,464,110 | Wright | Mar. 8, 1949 |
| 2,471,289 | Sedgwick | May 24, 1949 |
| 2,489,435 | Robinson | Nov. 29, 1949 |
| 2,586,932 | Gardiner | Feb. 26, 1952 |
| 2,625,177 | Ziskal | Jan. 13, 1953 |
| 2,705,971 | Dorkins | Apr. 12, 1955 |